(12) United States Patent
Lee et al.

(10) Patent No.: US 10,670,918 B2
(45) Date of Patent: Jun. 2, 2020

(54) LIQUID CRYSTAL DISPLAY WITH IMPROVED BACKLIGHT

(71) Applicant: Samsung Display Co., Ltd., Yongin-si, Gyeonggi-do (KR)

(72) Inventors: Yun-Gun Lee, Asan-si (KR); Min Wook Park, Asan-si (KR)

(73) Assignee: Samsung Display Co., Ltd. (KR)

( * ) Notice: Subject to any disclaimer, the term of this patent is extended or adjusted under 35 U.S.C. 154(b) by 233 days.

(21) Appl. No.: 15/826,426

(22) Filed: Nov. 29, 2017

(65) Prior Publication Data

US 2018/0143495 A1 May 24, 2018

Related U.S. Application Data

(62) Division of application No. 14/942,477, filed on Nov. 16, 2015, now Pat. No. 9,857,632.

(30) Foreign Application Priority Data

Jan. 6, 2015 (KR) .......................... 10-2015-0001318

(51) Int. Cl.
*G02F 1/1335* (2006.01)
*G09G 3/34* (2006.01)
*G02F 1/13357* (2006.01)

(52) U.S. Cl.
CPC ....... *G02F 1/133611* (2013.01); *G09G 3/342* (2013.01); *G02F 1/133602* (2013.01); *G09G 3/3406* (2013.01)

(58) Field of Classification Search
CPC ......... G09G 3/3426; G09G 2320/0646; G09G 2320/0271; G09G 2320/0238; G09G 2320/066; G09G 2320/0233; G09G 2320/062; G09G 3/3406; G09G 3/3413; G09G 2320/103; G09G 2320/0626; G09G 2320/0653; G09G 3/342; G09G 3/34; G02F 1/133611; G02F 1/133602
See application file for complete search history.

(56) References Cited

U.S. PATENT DOCUMENTS 9,588,379 B2 * 3/2017 Park ................... G02F 1/13394
2007/0146569 A1 * 6/2007 Nouchi ............ G02F 1/133602
349/58

(Continued)

FOREIGN PATENT DOCUMENTS

KR    10-2010-0038821 A    4/2010
KR    10-2010-0120022 A    11/2010

(Continued)

*Primary Examiner* — Huyen L Ngo
(74) *Attorney, Agent, or Firm* — Innovation Counsel LLP

(57) ABSTRACT

A liquid crystal display includes: a liquid crystal panel including a first substrate and a second substrate facing each other, and a liquid crystal layer provided between the first substrate and the second substrate; a local backlight unit configured to irradiate beams to a first region of the liquid crystal panel and including a plurality of light emitting blocks including a first light emitting block, each of the light emitting blocks emitting beams with controllable luminance; a global backlight unit configured to irradiate beams of uniform luminance to a second region of the liquid crystal panel; and a backlight driver configured to supply a driving signal to the local backlight unit and the global backlight unit.

14 Claims, 5 Drawing Sheets

(56) References Cited

U.S. PATENT DOCUMENTS

| | | | |
|---|---|---|---|
| 2010/0201718 A1 | 8/2010 | Yoon et al. | |
| 2011/0025725 A1 | 2/2011 | Hulze | |
| 2011/0291919 A1 | 12/2011 | Kerofsky et al. | |
| 2015/0185565 A1* | 7/2015 | Park | G02F 1/134363 349/43 |
| 2016/0139458 A1* | 5/2016 | Ma | G02F 1/133512 349/106 |
| 2016/0139462 A1* | 5/2016 | Park | G02F 1/133528 349/96 |
| 2016/0140917 A1* | 5/2016 | Hyung | G09G 3/3648 345/694 |
| 2016/0299283 A1* | 10/2016 | Yu | H01L 51/5237 |

FOREIGN PATENT DOCUMENTS

| | | |
|---|---|---|
| KR | 10-2011-0003806 A | 1/2011 |
| KR | 10-2011-0064089 A | 6/2011 |
| KR | 10-1351414 | 1/2014 |

\* cited by examiner (a)

(b)

LIQUID CRYSTAL DISPLAY WITH IMPROVED BACKLIGHT

CROSS-REFERENCE TO RELATED APPLICATION

This application is a divisional application of U.S. patent application Ser. No. 14/942,477 filed on Nov. 16, 2015, which claims priority to Korean Patent Application No. 10-2015-0001318, filed on Jan. 6, 2015 in the Korean Intellectual Property Office (KIPO), and all the benefits accruing therefrom under 35 U.S.C. § 119, the contents of the prior applications being herein incorporated by reference.

BACKGROUND

(a) Field

Embodiments of the present system and method relate to a liquid crystal display. More particularly, the present system and method relate to a curved liquid crystal display in which occurrences of black mura are prevented or otherwise reduced.

(b) Description of the Related Art

Flat panel displays for displaying information have been actively developed according to the informational development of society. The flat panel displays exemplarily include a liquid crystal display, an organic electro-luminescence display device, a plasma display device, and a field emission display.

Among them, the liquid crystal display (LCD) is widely used for mobile phones, global positioning systems, monitors, and televisions due to its light weight, thinness, smallness, lower power consumption, and ability to display full color videos.

The liquid crystal display includes two substrates on which electrodes are formed and a liquid crystal layer inserted therebetween. By controlling a voltage applied to the electrodes, thereby controlling the magnitude of an electric field formed between the electrodes, the liquid crystal display is able to control the light transmittance of the liquid crystal layer to display an image.

Recently, liquid crystal displays are becoming larger and are also being developed as a curved type to enhance immersion and realism of viewers. By applying external force to a flat liquid crystal display, a curved liquid crystal display may be manufactured to have a constant curvature.

In the case of the curved liquid crystal display, however, phase retardation of a glass substrate varies a shear stress according to the curvature, and as a result, black mura occurs. Black mura generally refers to a smudge in which a specific region is displayed brighter than other regions and may be caused by light leakage when a black screen is displayed. Occurrences of black mura deteriorate the display quality of the curved liquid crystal display.

The above information disclosed in this Background section is only for enhancement of understanding of the background of the present disclosure and, therefore, may contain information that does not form the prior art that is already known in this country to a person of ordinary skill in the art.

SUMMARY

The present disclosure provides a curved liquid crystal display in which occurrences of black mura are prevented or otherwise reduced.

An exemplary embodiment of the present system and method provides a liquid crystal display including: a liquid crystal panel including a first substrate and a second substrate facing each other, and a liquid crystal layer provided between the first substrate and the second substrate; a local backlight unit configured to irradiate beams to a first region of the liquid crystal panel and including a plurality of light emitting blocks including a first light emitting block, each of the light emitting blocks emitting beams with controllable luminance; a global backlight unit configured to irradiate beams of uniform luminance to a second region of the liquid crystal panel; and a backlight driver configured to supply a driving signal to the local backlight unit and the global backlight unit.

The local backlight unit may be disposed behind the first region including a black mura region, and the global backlight unit may be disposed behind the second region excluding a black mura region.

The first light emitting block may irradiate beams to a black mura region of the liquid crystal panel, and when a same image signal is applied, luminance of beams irradiated by the first light emitting block is less than luminance of beams irradiated by the global backlight unit.

Another embodiment of the present system and method provides a curved liquid crystal display including: a curved liquid crystal panel including a first substrate and a second substrate facing each other, and a liquid crystal layer provided between the first substrate and the second substrate; a local backlight unit configured to irradiate beams to a first region of the liquid crystal panel and including a plurality of light emitting blocks including a first light emitting block and a second light emitting block, each of the light emitting blocks emitting beams with controllable luminance; a global backlight unit configured to irradiate beams of uniform luminance to a second region of the liquid crystal panel; and a backlight driver configured to supply a driving signal to the local backlight unit and the global backlight unit.

The local backlight unit may be disposed behind an upper region or a lower region of the liquid crystal panel, and the global backlight unit may be disposed behind a center region of the liquid crystal panel.

The second light emitting block may irradiate beams to a normal region of the liquid crystal panel that is free from a black mura region, and when a same image signal is applied, luminance of the beams irradiated by the first light emitting block is less than luminance of the beams irradiated by the second light emitting block.

Another embodiment of the present system and method provides a liquid crystal display including: a curved liquid crystal panel including a first substrate and a second substrate facing each other, and a liquid crystal layer provided between the first substrate and the second substrate; a backlight unit configured to irradiate beams to a first region of the liquid crystal panel and irradiate beams with same luminance to a second region of the liquid crystal panel, the first region including a plurality of sub-regions including a first sub-region and a second sub-region; and a backlight driver configured to supply a driving signal to the backlight unit, wherein the backlight unit applies light with different luminance to the first sub-region and the second sub-region when irradiating beams to the first region.

The backlight unit may include: a first light emitting block group configured to irradiate beams to the first region of the liquid crystal panel and including a plurality of light emitting blocks including a first light emitting block; and a second light emitting block group including a plurality of light emitting blocks configured to irradiate beams to the second region of the liquid crystal panel.

Respective light emitting blocks of the first light emitting block group and respective light emitting blocks of the second light emitting block group may emit light with controllable luminance.

According to the embodiments of the present system and method, occurrences of black mura are prevented or otherwise reduced in the curved liquid crystal display.

DETAILED DESCRIPTION OF THE EMBODIMENTS

Figure 1:
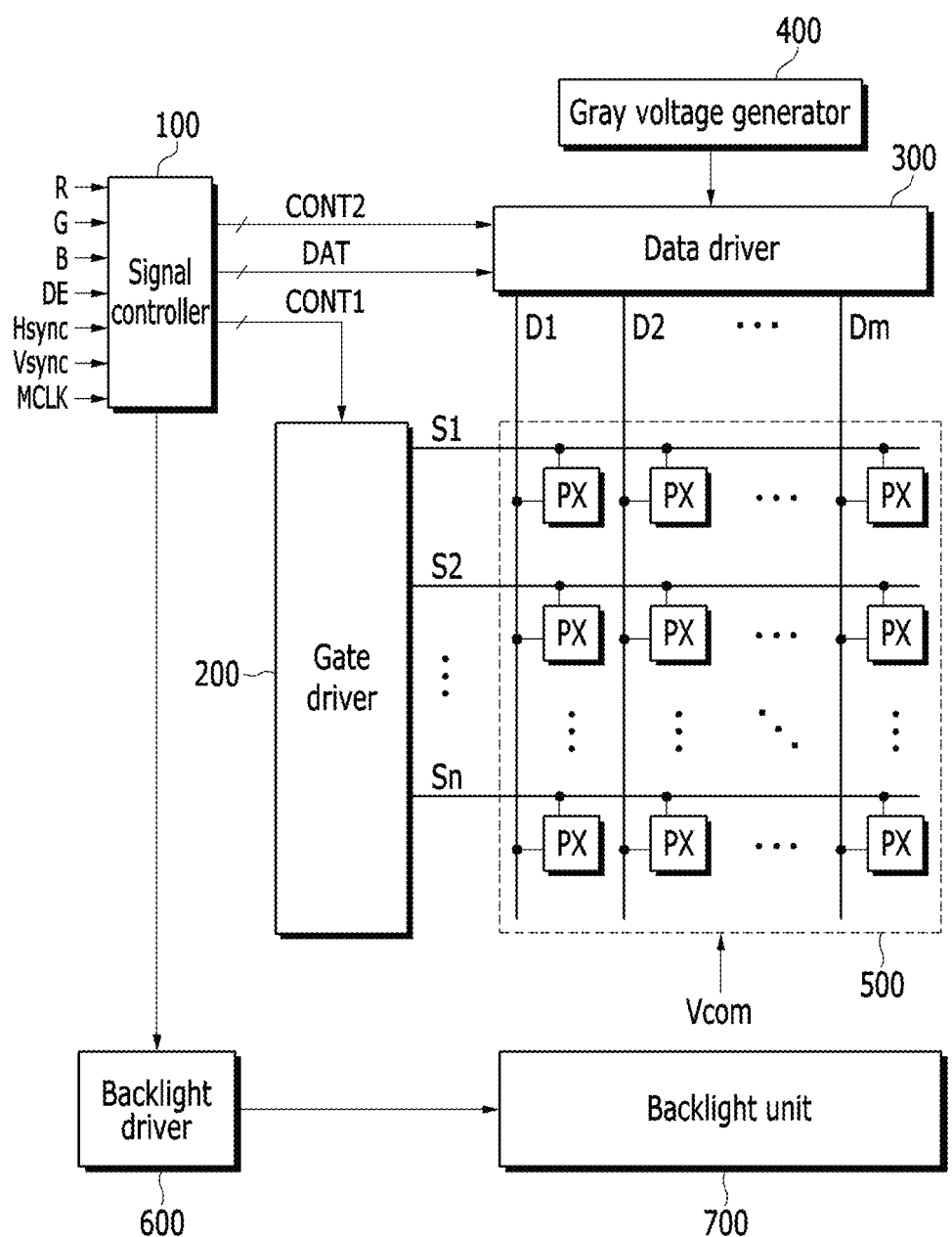
FIG. 1 shows a block diagram of a curved liquid crystal display according to an exemplary embodiment of the present system and method.

In the following detailed description, only certain exemplary embodiments of the present system and method are shown and described for purposes of illustration. Those of ordinary skill in the art would realize that the described embodiments may be modified in various different ways without departing from the spirit or scope of the present system and method.

Furthermore, with exemplary embodiments of the present system and method, a detailed description of the constituent elements in the first exemplary embodiment is provided with reference to the relevant drawings, while only constituent elements different from those related to the first exemplary embodiment are described for the other exemplary embodiments. The same reference numerals are used to refer to the same constituent elements throughout the exemplary embodiments.

Parts that are unrelated to the description of the exemplary embodiments are not shown to make the description clear, and like reference numerals designate like element throughout the specification.

Throughout this specification and the claims that follow, when an element is described as "coupled" to another element, the element may be "directly coupled" to the other element or "electrically coupled" to the other element through a third element. In addition, unless explicitly described to the contrary, the word "comprise" and variations such as "comprises" or "comprising" imply the inclusion of stated elements but not the exclusion of any other elements.

In the drawings, the thickness of layers, films, panels, regions, etc., are exaggerated for clarity. Like reference numerals designate like elements throughout the specification. When an element such as a layer, film, region, or substrate is referred to as being "on" another element, it may be directly on the other element, or intervening elements may also be present. In contrast, when an element is referred to as being "directly on" another element, there are no intervening elements present.

A curved liquid crystal display according to an exemplary embodiment of the present system and method is now described with reference to the accompanying drawings.

FIG. 1 shows a block diagram of a curved liquid crystal display according to an exemplary embodiment of the present system and method.

Referring to FIG. 1, the curved liquid crystal display includes a signal controller 100, a gate driver 200, a data driver 300, a gray voltage generator 400, a liquid crystal panel 500, a backlight driver 600, and a backlight unit 700.

The liquid crystal panel 500 includes an upper substrate, a lower substrate, and a liquid crystal material provided between the substrates. The liquid crystal panel 500 includes a plurality of gate lines (S1-Sn), data lines (D1-Dm), and pixels PX. The pixels PX are connected to the gate lines (S1-Sn) and the data lines (D1-Dm) and are arranged in a substantially matrix form. The gate lines (S1-Sn) are extended in a substantially row direction and are substantially parallel with each other. The data lines (D1-Dm) are extended in a substantially column direction and are substantially parallel with each other. Although FIG. 1 only illustrates a plurality of gate lines (S1-Sn) and a plurality of data lines (D1-Dm) connected to a plurality of pixels PX, various signal lines, such as a power voltage supply line or a voltage-division reference voltage line, may be additionally connected to the pixels PX depending on the configuration of the pixels PX or the driving method.

A backlight unit 700 for irradiating light to the liquid crystal panel 500 is provided on the rear side of the liquid crystal panel 500.

The signal controller 100 receives image signals R, G, and B and input control signals. The image signals R, G, and B include luminance information for the plurality of pixels. The input control signals include a data enable signal DE, a horizontal synchronizing signal Hsync, a vertical synchronization signal Vsync, and a main clock signal MCLK.

The signal controller 100 generates a gate control signal CONT1, a data control signal CONT2, and an image data signal DAT according to the image signals R, G, and B, the data enable signal DE, the horizontal synchronizing signal Hsync, the vertical synchronization signal Vsync, and the main clock signal MCLK. The signal controller 100 divides image signals R, G, and B for respective frames according to the vertical synchronization signal Vsync, and divides the image signals R, G, and B for respective gate lines according to the horizontal synchronizing signal Hsync to generate image data signal DAT.

The signal controller 100 provides the image data signal DAT and the data control signal CONT2 to the data driver 300. The data control signal CONT2 is a signal for controlling the data driver 300, and it includes a horizontal synchronization start signal STH for notifying the start of transmission of the image data signal DAT, a load signal LOAD for instructing the data driver 300 to output a data signal to the data lines (D1-Dm), and a data clock signal HCLK. The data control signal CONT2 may further include a reversing signal RVS for reversing the voltage polarity of the image data signal DAT with respect to a common voltage Vcom.

The signal controller 100 provides a gate control signal CONT1 to the gate driver 200. The gate control signal CONT1 includes a scanning start signal STV at the gate driver 200 and at least one clock signal for controlling the output of a gate-on voltage. The gate control signal CONT1 may further include an output enable signal OE for controlling a continuation time of the gate-on voltage.

The data driver 300 is connected to the data lines (D1-Dm) of the liquid crystal panel 500 and selects a gray voltage from the gray voltage generator 400. The data driver 300 applies the selected gray voltage to the data lines (D1-Dm) as the data signal. The gray voltage generator 400 may provide a subset of reference gray voltages rather than voltages for all available gray levels. In such case, the data driver 300 may divide the reference gray voltages to generate gray voltages for intermediate gray levels and may select the data signal from among them.

The gate driver 200 applies a gate signal that is a combination of a gate-on voltage for turning on a switching element connected to the gate lines (S1-Sn) of the liquid crystal panel 500 and a gate-off voltage for turning it off to the gate lines (S1-Sn).

The backlight driver 600 supplies a driving voltage (or a driving current) corresponding to an input image signal to the backlight unit 700, which generates light according to the driving voltage (or the driving current) and supplies it to the liquid crystal panel 500.

In general, it is desirable for the image displayed on the liquid crystal display to have a high contrast ratio. That is, dark areas of the image place should be displayed darker, and bright areas should be displayed brighter. A clearer image may be reproduced when a high contrast ratio is realized.

However, because a traditional backlight unit is generally driven by a predetermined backlight control signal irrespective of the input image signal, it is impossible or very difficult to realize a high contrast ratio. The general method for driving the backlight is hereinafter referred to as a normal luminance control method.

Recently, a global luminance control method (a global dimming control method hereinafter) that analyzes an image of one frame and then controls the luminance according to the analysis result has been proposed. However, the global luminance control method represents a method for controlling luminance for an image of one frame and does not allow luminance control on the local image. As such, the global luminance control method fails to acquire a high contrast ratio for a local region.

To solve this problem, a local luminance control method (also called a local dimming control method) that divides a one-frame image and respectively controls the luminance corresponding to the divided images has been proposed. However, the local luminance control method increases the manufacturing cost because it uses a plurality of LED blocks (light emitting blocks).

The backlight driver 600 according to an exemplary embodiment of the present system and method drives the backlight unit 700 according to the local luminance control method in a predetermined region of the liquid crystal panel and drives the backlight unit 700 according to the global luminance control method (or a normal luminance control method) in another predetermined region of the liquid crystal panel, which is described in a latter part of the specification.

Figure 2:
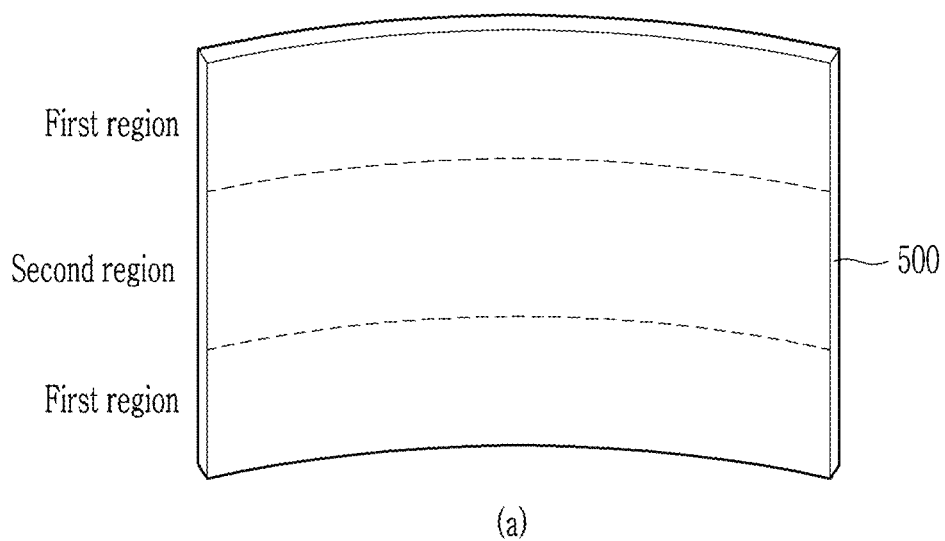
FIGS. 2A and 2B each shows a curved liquid crystal panel of a curved liquid crystal display according to an exemplary embodiment of the present system and method.
Figure 2:
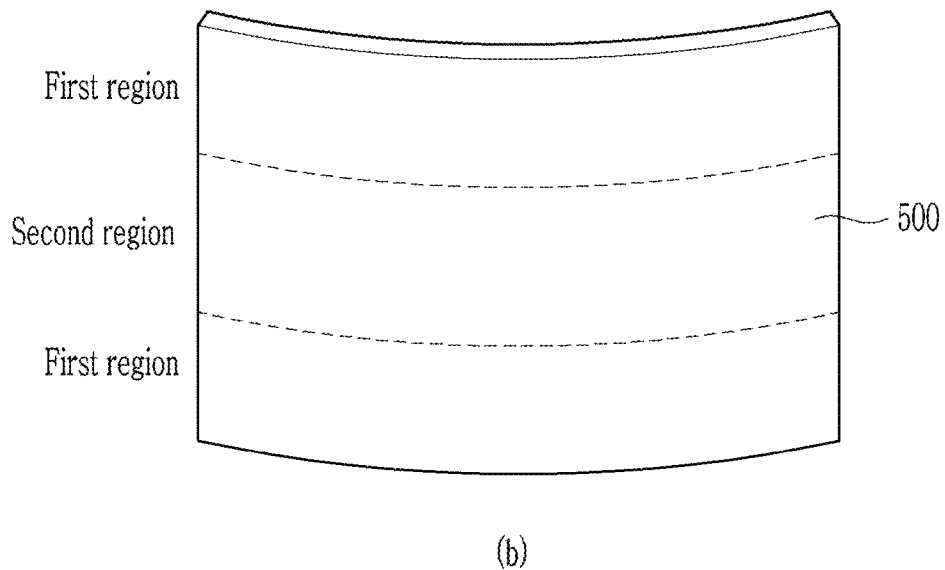

The liquid crystal panel 500 of the curved liquid crystal display may be formed to be concave as shown in FIG. 2A or convex as shown in FIG. 2B. With the concave type, a center portion of the liquid crystal panel 500 is moved back from its respective side edges with respect to an observer. That is, portions of the liquid crystal panel 500 extending sideways from the center portion curve toward the observer. With the convex type, the center portion thereof advances forward from the respective side edges with respect to the observer. That is, the portions of the liquid crystal panel 500 extending sideways from the center portion curve away from observer The curvature of the concave or convex liquid crystal panel 500 may be formed to be a constant curvature, or the curvature at the center portion of the liquid crystal panel 500 and the curvature of the side portions thereof may be different from each other (i.e., multiple curvatures). Generally, if the liquid crystal panel 500 is formed with a constant curvature, occurrences of black mura may be greater compared to the case in which the same is formed with multiple curvatures.

The liquid crystal panel 500 is described in the embodiments below as being the concave type.

Figure 3:
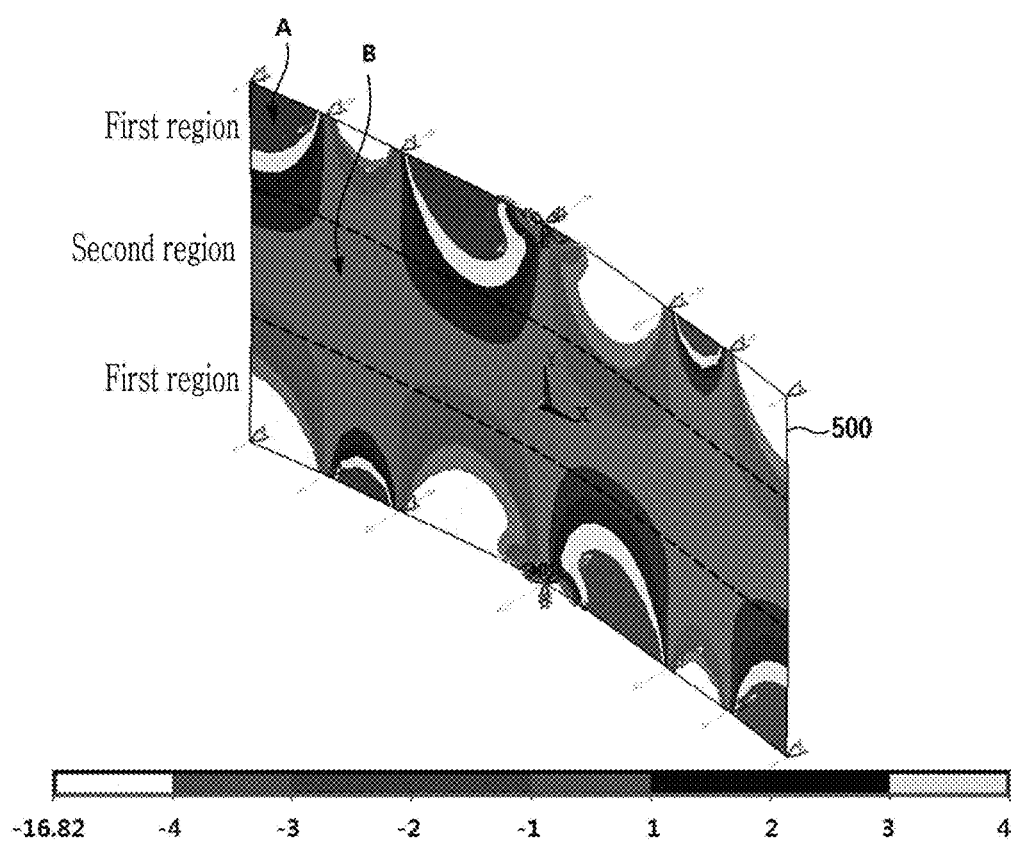
FIG. 3 shows a simulation result of a shear stress applied to a curved liquid crystal panel of a curved liquid crystal display according to an exemplary embodiment of the present system and method.

FIG. 3 shows a simulation result of a shear stress applied to a curved liquid crystal panel of a curved liquid crystal display according to an exemplary embodiment of the present system and method.

Referring to FIG. 3, when the liquid crystal panel 500 is formed to have a constant curvature or multiple curvatures using an external force, a shear stress occurs in the material to oppose the external force and try to return the liquid crystal panel 500 to its unstressed state.

As shown, a region (A) where a shear stress occurs is significantly distributed at upper and lower edge portions of the liquid crystal panel 500, and a region (B) where relatively no shear stress occurs is significantly distributed at a center portion thereof. The distribution of the region (A) is determined by a curvature radius of the liquid crystal panel 500 and a thickness of the substrate. The region (A) mostly corresponds to a black mura region where the black mura actually occurs. The region (B) corresponds to a normal region other than the black mura region. The distribution of the black mura region is determined by the curvature radius of the liquid crystal panel 500 and the thickness of the substrate. When the curvature radius of the liquid crystal panel 500 and the thickness of the substrate are configured with predetermined standards, distribution of the black mura region may be normalized.

According to an exemplary embodiment of the present system and method, deterioration of image quality caused by the black mura is prevented by locally changing luminance of the light by use of a local luminance (local dimming) control method on the black mura region distributed by the curvature radius and the substrate thickness, which is described in a latter part of the specification. In detail, because the black mura region is generally recognizable as brighter in a visible manner, when the same image signal is applied, a light applied to the black mura region may have less luminance than a light applied to the normal region.

Figure 4:
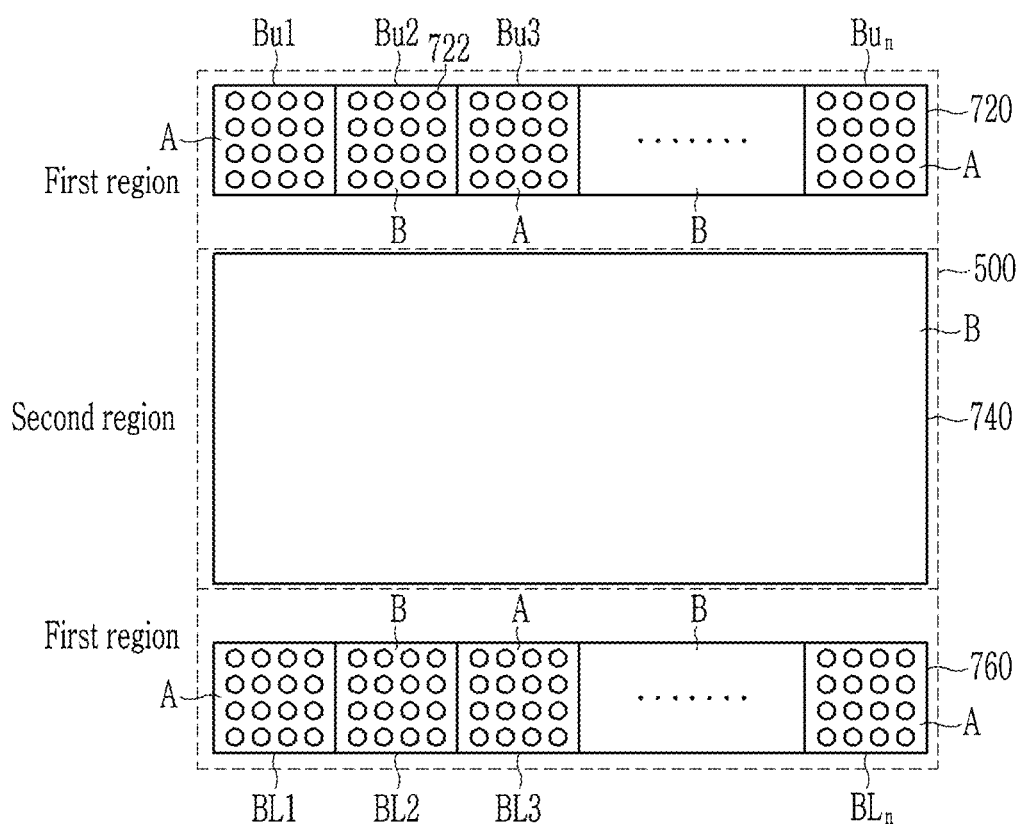
FIG. 4 shows a backlight unit according to an exemplary embodiment of the present system and method.

FIG. 4 shows a backlight unit 700 according to an exemplary embodiment of the present system and method.

The backlight unit 700 includes an upper local backlight unit 720, a lower local backlight unit 760, and a global backlight unit 740.

The upper local backlight unit 720 and the lower local backlight unit 760 irradiate beams to the upper and lower edge regions of the curved liquid crystal panel where black mura tends to generated. The global backlight unit 740 irradiates beams to the center region of the liquid crystal panel where black mura is usually not generated.

The upper and lower local backlight units 720 and 760 include a plurality of light emitting blocks (BU1, BU2, . . . BUn, BL1, BL2, . . . BLn), each of which includes a plurality of light emitting diodes (LEDs) 722. Although FIG. 4 shows that the upper local backlight unit 720 and the lower local backlight unit 760 respectively include one row of light emitting blocks, the present system and method are not limited thereto. For example, in another embodiment, they may include light emitting blocks of at least two rows According to an exemplary embodiment of the present system and method, the diodes 722 of the same light emitting block receive the same driving signal to emit light with the same luminance, and each of the light emitting blocks receive separate driving signals so that each light emitting block may emit a different luminance. Therefore, the respective blocks may emit light with optimized luminance.

Referring to FIG. 4, the light emitting diodes (LEDs) 722 included in the respective light emitting blocks may be provided as a package that is not shown. That is, a package may be provided for each light emitting block so a plurality of light emitting diodes (LEDs) 722 may be provided in the package of the light emitting blocks.

According to an exemplary embodiment of the present system and method, a first light emitting block among a plurality of light emitting blocks of the local backlight units 720 and 760 is disposed behind the panel region (A) where the black mura occurs and irradiate beams to the panel region (A), and a second light emitting block among the plurality of light emitting blocks of the local backlight units 720 and 760 is disposed behind the normal panel region (B) where no black mura occurs and irradiates beams to the normal panel region (B). In this instance, according to an exemplary embodiment of the present system and method, when the same image signal is applied, the light beams irradiated by the first light emitting block (i.e., beams irradiated to the black mura region) have less luminance than that of the light beams irradiated by the second light emitting block (i.e., the beams irradiated to the normal region).

The global backlight unit 740 includes a light guide (not shown) provided behind the center region of the liquid crystal panel to provide beams to the liquid crystal panel and a light source (e.g., a plurality of light emitting diodes (LEDs)) formed on one side of the light guide. The global backlight unit irradiates the beams with uniform luminance to the center region of the liquid crystal panel.

Figure 5:
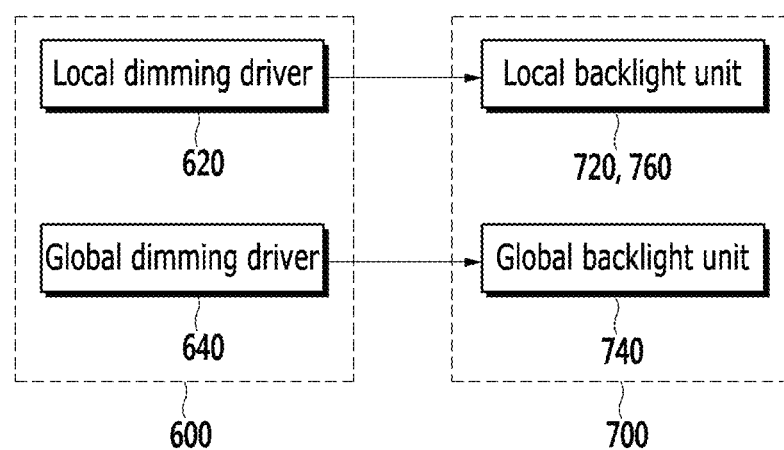
FIG. 5 shows a backlight driver according to an exemplary embodiment of the present system and method.

FIG. 5 shows a backlight driver 600 according to an exemplary embodiment of the present system and method.

As shown in FIG. 5, the backlight driver 600 includes a local dimming driver 620 for generating a driving voltage (or a driving current) supplied to the local backlight units 720 and 760, and a global dimming driver 640 for generating a driving voltage (or a driving current) supplied to the global backlight unit 740.

The local dimming driver 620 performs a predetermined local dimming algorithm to analyze an input image for respective light emitting blocks and determine representative values (or representative gray values for respective blocks) of the respective light emitting blocks (BU1, BU2, . . . BUn, BL1, BL2, . . . BLn). Here, known local dimming algorithms may be used. The representative values for respective blocks may be determined as one of a mode, a maximum value, and an average value of a histogram acquired by performing a histogram analysis on the input images divided according to the respective light emitting blocks.

The local dimming driver 620 searches for the driving voltage (or the driving current) corresponding to the representative values for respective blocks from a lookup table (storing the driving voltage or the current value corresponding to the representative value) and supplies a corresponding driving voltage (or a driving current) to the respective light emitting blocks.

The global dimming driver 640 analyzes the image for respective frames, generates a driving voltage (or a driving current) corresponding to a frame image, and supplies the driving voltage to the global backlight unit 740 according to the analysis result, or supplies a predetermined driving voltage (or a driving current) to the global backlight unit 740 irrespective of the input image signal.

Although a local backlight unit is provided behind the upper and lower regions of the liquid crystal panel and a global backlight unit is provided behind the center region of the panel in the above-described exemplary embodiment, the present system and method are not restricted thereto. For example, only the local backlight unit may be provided and implemented at the lower portion of the panel without the global backlight unit.

When the lower portion of the panel is realized with the local backlight unit without the global backlight unit, the beams with different luminance are irradiated to the lower portions of the upper and lower regions (the regions where the black mura is provided) of the liquid crystal panel, and the beams with same luminance are irradiated to the center portion (the region where no black mura is provided) of the liquid crystal panel.

According to the exemplary embodiment of the present system and method, the local backlight unit is provided behind the upper and lower regions of the liquid crystal panel where the black mura occurs, and the light beams applied to the black mura regions have luminance that is less than that of the light beams applied to the normal regions of the liquid crystal panel, thereby reducing deterioration of image quality caused by the black mura.

Further, because the global backlight unit driven by the global dimming control method or the normal luminance control method is provided in the center region of the liquid crystal panel where no black mura occurs, the manufacturing cost may be minimized compared to the case in which the entire display region of the panel utilizes the local dimming scheme.

The accompanying drawings and the exemplary embodiments of the present system and method are only provided as examples and do not limit the scope of the present system and method as defined by the following claims. Those of ordinary skill in the art would understand that various modifications and equivalent embodiments may be made.

What is claimed is:

1. A curved liquid crystal display comprising:
    a curved liquid crystal panel including a first substrate and a second substrate facing each other, and a liquid crystal layer provided between the first substrate and the second substrate;
    a local backlight unit facing the liquid crystal panel configured to irradiate beams to a first region of the liquid crystal panel and including a plurality of light emitting blocks including a first light emitting block and a second light emitting block, each of the light emitting blocks emitting beams with controllable luminance;
    a global backlight unit facing the liquid crystal panel configured to irradiate beams of uniform luminance to a second region of the liquid crystal panel, the second region separate from the first region; and
    a backlight driver configured to supply a driving signal to the local backlight unit and the global backlight unit.

2. The curved liquid crystal display of claim 1, wherein the local backlight unit is disposed behind the first region including a black mura region generated by the curvature of the curved liquid crystal panel.

3. The curved liquid crystal display of claim 1, wherein the local backlight unit is disposed behind an upper region or a lower region of the liquid crystal panel, the upper region and the lower region included in the first region.

4. The curved liquid crystal display of claim 3, wherein the global backlight unit is disposed behind a center region of the liquid crystal panel, the center region between the upper region and the lower region.

5. The curved liquid crystal display of claim 1, wherein the first light emitting block irradiates beams to a black mura region of the liquid crystal panel, the black mura region included in the first region, and
when a same image signal is applied, luminance of the beams irradiated by the first light emitting block is less than luminance of the beams irradiated by the global backlight unit.

6. The curved liquid crystal display of claim 1, wherein the second light emitting block irradiates beams to a normal region of the liquid crystal panel that is free from a black mura region, the black mura region included in the first region and the normal region included in the second region, and
when a same image signal is applied, luminance of the beams irradiated by the first light emitting block is less than luminance of the beams irradiated by the second light emitting block.

7. The curved liquid crystal display of claim 1, wherein the backlight driver includes:
a local dimming driver configured to generate a first driving signal supplied to the local backlight unit; and
a global dimming driver configured to generate a second driving signal supplied to the global backlight unit.

8. The curved liquid crystal display of claim 7, wherein the first driving signal is supplied to respective light emitting blocks based on an image signal applied to respective regions of the liquid crystal panel corresponding to the respective light emitting blocks.

9. A liquid crystal display comprising:
a curved liquid crystal panel including a first substrate and a second substrate facing each other, and a liquid crystal layer provided between the first substrate and the second substrate;
a backlight unit configured to irradiate beams to a first region of the liquid crystal panel and irradiate beams of uniform luminance to a second region of the liquid crystal panel, the first region including a plurality of sub-regions including a first sub-region and a second sub-region; and
a backlight driver configured to supply a driving signal to the backlight unit,
wherein the backlight unit applies light with different luminance to the first sub-region and the second sub-region when irradiating beams to the first region.

10. The liquid crystal display of claim 9, wherein
the backlight unit includes:
a local backlight unit including a plurality of light emitting blocks including a first light emitting block configured to irradiate beams to the first region of the liquid crystal panel including the first sub-region and the second sub-region, the light emitting blocks respectively emitting light with controllable luminance; and
a global backlight unit configured to irradiate beams of uniform luminance to the second region of the liquid crystal panel.

11. The liquid crystal display of claim 9, wherein
the backlight unit includes:
a first light emitting block group configured to irradiate beams to the first region of the liquid crystal panel and including a plurality of light emitting blocks including a first light emitting block; and
a second light emitting block group including a plurality of light emitting blocks configured to irradiate beams to the second region of the liquid crystal panel.

12. The liquid crystal display of claim 11, wherein respective light emitting blocks of the first light emitting block group and respective light emitting blocks of the second light emitting block group emit light with controllable luminance.

13. The liquid crystal display of claim 11, wherein the first light emitting block group is disposed behind the first region of the liquid crystal panel where a black mura region is provided.

14. The liquid crystal display of claim 11, wherein the first light emitting block irradiates beams to a black mura region of the liquid crystal panel, and
when a same image signal is applied, luminance of the light irradiated by the first light emitting block is less than luminance of the light irradiated by the second light emitting block group.

* * * * *